United States Patent
Berge et al.

(10) Patent No.: US 7,499,223 B2
(45) Date of Patent: Mar. 3, 2009

(54) VARIABLE-FOCUS LENS AND METHOD OF MANUFACTURING THE SAME

(75) Inventors: Bruno Berge, Lyons (FR); Jérome Peseux, Solaize (FR); Mathieu Maillard, Lyons (FR); Pierre Craen, Lyons (FR)

(73) Assignee: Varioptic S.A., Lyons (FR)

( * ) Notice: Subject to any disclaimer, the term of this patent is extended or adjusted under 35 U.S.C. 154(b) by 4 days.

(21) Appl. No.: 11/472,562

(22) Filed: Jun. 22, 2006

(65) Prior Publication Data

US 2007/0002455 A1    Jan. 4, 2007

(30) Foreign Application Priority Data

Jun. 23, 2005    (FR)    ................... 05 51737

(51) Int. Cl.
*G02B 1/06*    (2006.01)
*G02B 3/12*    (2006.01)

(52) U.S. Cl. ...................... 359/666; 359/665
(58) Field of Classification Search ................ 359/290, 359/297, 665, 666
See application file for complete search history.

(56) References Cited

U.S. PATENT DOCUMENTS

| | | | |
|---|---|---|---|
| 4,030,813 A | 6/1977 | Kohashi et al. | |
| 5,659,330 A | 8/1997 | Sheridon | |
| 6,369,954 B1 | 4/2002 | Berge et al. | |
| 7,006,299 B2 * | 2/2006 | Kroupenkine | 359/665 |
| 2001/0017985 A1 | 8/2001 | Tsuboi et al. | |
| 2004/0160684 A1 | 8/2004 | Prins et al. | |
| 2004/0227838 A1 | 11/2004 | Atarashi et al. | |
| 2005/0002113 A1 | 1/2005 | Berge | |
| 2006/0126190 A1 | 6/2006 | Berge et al. | |
| 2006/0152814 A1 | 7/2006 | Peseux | |
| 2006/0256448 A1 | 11/2006 | Oh et al. | |
| 2007/0153400 A1 * | 7/2007 | Oh et al. | 359/666 |
| 2007/0177276 A1 | 8/2007 | D'Ardhuy et al. | |
| 2007/0179200 A1 | 8/2007 | D'Ardhuy et al. | |
| 2007/0179201 A1 | 8/2007 | Maillard et al. | |

(Continued)

FOREIGN PATENT DOCUMENTS

DE    197 10 668 A1    9/1998

(Continued)

OTHER PUBLICATIONS

S. Kuiper et al., "Variable-focus liquid lens for portable applications," Proceedings of SPIE, vol. 5523, pp. 100-209. (2004).

(Continued)

*Primary Examiner*—David N Spector
(74) *Attorney, Agent, or Firm*—Osha • Liang LLP

(57) ABSTRACT

The invention relates to a variable-focus lens (60) for focusing light rays in light paths passing through the lens along an optical axis (Δ). The lens comprises an arrangement of first and second immiscible liquids (67, 68) that have different refractive indices and are in contact over a moveable refractive optical interface (69), a volume of gas (72) in contact with one of said liquids, and a retention measure (70, 74) for keeping the volume of gas away from the light paths of the light rays passing through the lens for focusing.

18 Claims, 3 Drawing Sheets

U.S. PATENT DOCUMENTS

| | | | |
|---|---|---|---|
| 2008/0030870 A1* | 2/2008 | Bruno et al. | 359/666 |
| 2008/0247051 A1* | 10/2008 | Hendriks et al. | 359/666 |

FOREIGN PATENT DOCUMENTS

| | | | |
|---|---|---|---|
| JP | 2002-162506 A | 6/2002 | |
| JP | 2002-169005 A | 6/2002 | |
| JP | 2003-29005 A | 1/2003 | |
| JP | 2003-57409 A | 2/2003 | |
| WO | WO 96/41227 A1 | 12/1996 | |
| WO | WO 97/43731 A1 | 11/1997 | |
| WO | WO 03/069380 A1 | 8/2003 | |
| WO | WO 2004/051323 A1 | 6/2004 | |
| WO | WO 2004/077125 A2 | 9/2004 | |
| WO | WO 2004/099847 A1 | 11/2004 | |
| WO | WO 2006/027522 A1 | 3/2006 | |
| WO | WO 2006/103281 A1 | 10/2006 | |
| WO | WO 2006/103290 A1 | 10/2006 | |

OTHER PUBLICATIONS

B. Berge et al., "Variable focal lens controlled by an external voltage: An application of electrowetting," The European Physical Journal E, (2000), pp. 159-163.

* cited by examiner

VARIABLE-FOCUS LENS AND METHOD OF MANUFACTURING THE SAME

CROSS-REFERENCE TO RELATED PATENT APPLICATIONS

The right of foreign priority is claimed under 35 U.S.C. §119(a) based on France Application No. 0551737, filed Jun. 23, 2005, the entire contents of which, including the specification, drawings, claims and abstract, are incorporated herein by reference.

BACKGROUND OF THE INVENTION

The present invention relates to a variable-focus lens and more particularly to a lens involving the deformation of a body of liquid ("drop") by electrowetting effects.

A variable-focus lens usually comprises an enclosure, bounded by two transparent windows, which contains at least two immiscible liquids of different refractive indices. The two liquids are in contact over a moveable refractive interface through which the light rays received by the lens pass. The liquid lens includes a system for deforming the moveable refractive interface by electrowetting effects, thus making it possible to modify the optical power of the lens.

The housing for such a lens generally constitutes a rigid structure. The pressure of the liquids in the housing may increase substantially, for example, during the operations of assembling the components of the housing, or, once the housing has been assembled, upon an increase in temperature of the liquids of the lens, which have higher expansion coefficients than the expansion coefficients of the constituent materials of the housing.

Excessive pressure of the liquids contained in the housing increases the risk of causing the transparent plates to deform, resulting in an undesirable optical distortion. In the worst case, if the increase in pressure of the liquids is too high, this may result in fracture of the transparent plates. Special precautions therefore have to be taken when assembling the mount for the lens and/or to limit the temperature range permitted for storing and using such a lens.

Patent application U.S. Ser. No. 11/284125, which is commonly owned and not yet published (not prior art), describes a housing for a variable-focus lens that includes a compensating device for the expansion of the liquids contained therein. The disclosure of this prior application is incorporated by reference into the present application.

FIG. 1 is substantially similar to FIG. 3 of patent application U.S. Ser. No. 11/284125 and shows a variable-focus lens mount 10, having an optical axis Δ, which comprises an upper part 12 and a lower part 14 which, when they are assembled, define an internal volume 15. The lower part 14 comprises a body 16 having a base 17 through which a central opening 18 passes, the base being extended by a cylindrical lateral portion 20. The base 17 comprises a corrugated portion 23, the cross section of which in a plane containing the axis Δ has the exact or approximate form of an "S". A transparent cylindrical plate 24 is fastened to the body 16 by adhesive 22. The upper part 12 of the mount 10 comprises a cover 30 through the central part of which a cylindrical opening 32 passes. The upper part is extended by a cylindrical lateral wall 34. The cover 30 includes an elastic portion 36 provided between the opening 32 and the cylindrical lateral wall 34. The elastic portion 36 comprises a corrugated portion, the cross section of which in a plane containing the axis Δ has the exact or approximate form of an "S". A transparent cylindrical plate 38 is fastened to the cover 30 by adhesive 40. An intermediate piece 42 is placed in the internal volume 15 in electrical contact with the body 16. Passing through the intermediate piece 42 is an opening that defines a truncated conical surface 48 adjacent to the glass plate 24. The intermediate piece 42 is made of a conducting material and is covered with an insulating layer 49 on the surfaces in contact with the liquids. A seal 50 is placed between the body 16 and the cover 30.

A volume ("drop") of an insulating liquid 52 is placed on the conical surface 48, and the rest of the internal volume 15 is filled with an electrically conducting liquid 54, which is immiscible with the insulating liquid, has a different refractive index from and has substantially the same density as the insulating liquid. By electrowetting effects, it is possible to modify the curvature of the contact surface between the two liquids, as a function of a voltage V applied between the intermediate piece 42 and the cover 30, which form two electrodes. During this change in the curvature of the liquid-liquid interface, the edge of the interface between the conducting liquid 54 and the insulating liquid 52 moves along the conical surface 48. For example, the contact surface passes from the initial, e.g., concave shape, denoted by the reference A, to the convex shape illustrated by the dashed curve and denoted by the reference B. Thus, a light beam passing through the cell orthogonally to the plates 38 and 24 will be focused to a greater or lesser extent according to the applied voltage. In general, the conducting liquid comprises an aqueous liquid, and the insulating liquid comprises an oily liquid.

The "S"-shaped corrugated portions 23, 36 are able to deform when the liquids contained in the internal volume 15 expand, so as to limit the increase in internal pressure of the lens.

One possible limitation of such a lens is that a certain degree of deformation of the corrugated portions 23, 36 may result in a change in the shape of the lens housing, especially the distance separating the two transparent plates 24, 38. This may lead to the appearance of additional optical defects. Furthermore, the fact that the housing is deformable may make it difficult for the components of the housing to be precisely positioned, one with respect to another. Thus, it may prove difficult to keep the optical part of the lens centered with respect to a reference external to the lens. In addition, the production of the "S"-shaped portions 23, 36 requires specific stamping steps, which complicates the manufacture of such a lens. Thus, the present invention can be employed together with other measures for controlling the pressure inside the lens, such as the device described in the commonly owned earlier application, or it may be employed as the sole pressure controlling measure in a lens system.

SUMMARY OF THE INVENTION

One object of the present invention is to provide a variable-focus lens that is easy to manufacture and that makes it possible to limit the variation in the internal pressure of the lens when there is a temperature change, while keeping the structure of the lens rigid.

For this purpose, the invention provides an electrowetting variable-focus lens comprising at least first and second liquids and a volume of gas in contact with one of the liquids, the volume of gas comprising for example one or more bubbles of gas, and a retention measure for keeping the volume of gas away from the paths of the light rays passing through the lens for focusing.

According to one preferred embodiment of the present invention, the lens comprises a first chamber containing first and second immiscible liquids, of different refractive indices, in contact over a refractive optical interface that can be deformed by electrowetting effects; a second chamber containing the first liquid and a volume of gas; and a passage for the first liquid to pass between the first and second chambers.

According to another preferred embodiment of the present invention, the second chamber comprises at least one wall in contact with the volume of gas, and this wall comprises or is covered by a material that has low wettability by the first liquid.

According to another preferred embodiment of the present invention, the passage comprises walls that comprise or are covered by a material that has high wettability by the first liquid.

According to another preferred embodiment of the present invention, the second chamber is bounded by first, second and third walls, the first wall being inclined at a first angle to the second wall, the second wall being inclined at a second angle to the third wall, and the first wall being inclined at a third angle to the third wall, the first angle being smaller than the second angle and smaller than the third angle.

According to another preferred embodiment of the present invention, the passage and/or the second chamber are formed by pores of a porous material.

According to another preferred embodiment of the present invention, the second chamber has the form of a tube, wherein one end of the tube opens into the first chamber and the opposite end of the tube is closed.

According to a further preferred aspect of the present invention, there is provided a method of manufacturing an electrowetting variable-focus lens, comprising the steps of forming a partial enclosure formed of a enclosure member; filling the partial enclosure with at least one liquid; forming a volume of gas in the partial enclosure, wherein the volume of gas is in contact with said liquid in a region through which light rays passing through the lens do not pass; and closing off the enclosure with a second enclosure member to form a sealed enclosure.

According to one preferred method of implementing the present invention, the three last-recited steps of the above method are carried out under reduced pressure, i.e. below atmospheric pressure.

These and further objects, features and advantages of the present invention will be explained in detail in the following description of particular preferred, non-limiting exemplary embodiments, when considered in relation to the accompanying figures of drawing.

DETAILED DESCRIPTION OF THE PREFERRED EMBODIMENTS

Figure 1:
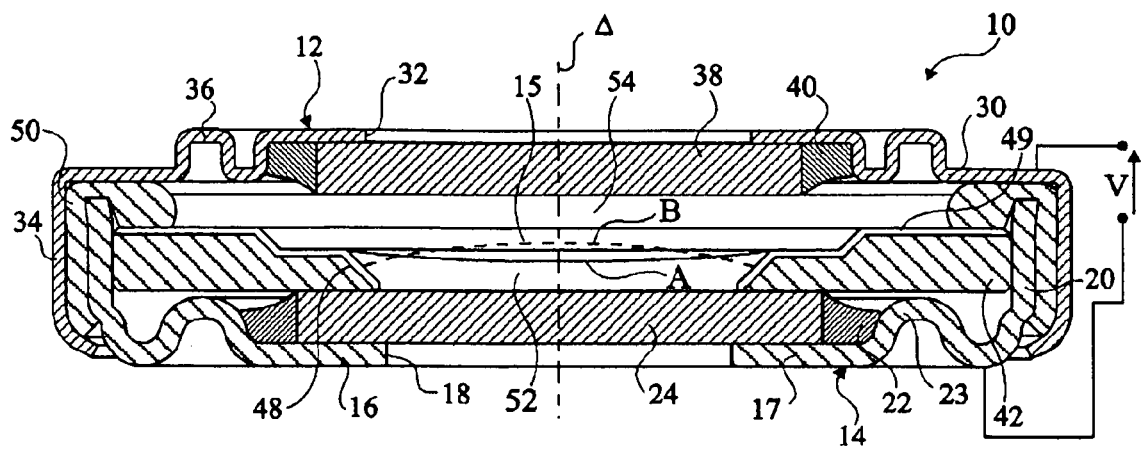
FIG. 1, described above, is a section through a variable-focus lens that includes a device for compensating for the expansion of the liquids contained in the lens according to an earlier commonly owned proposal.

For the sake of clarity, identical elements have been denoted by the same reference numerals in the various figures.

The present invention relates to intentionally introducing a volume of gas into contact with one of the liquids contained in the lens, taking care to prevent the volume of gas from being present in the region through which the light rays pass. Retention measures are used to prevent the volume of gas from being displaced into the light path. When the temperature changes, the liquids contained in the lens expand, and this expansion is compensated by the volume of gas, which by nature is very compressible, thus limiting the change in internal pressure of the lens. The gas may be, for example, air, an inert gas or a mixture of inert gases, or, alternatively or in combination, the vapour of one of the liquids contained in the lens.

According to the invention, the volume of gas could comprise, for example, one or more bubbles of gas contained in the lens.

Figure 2:
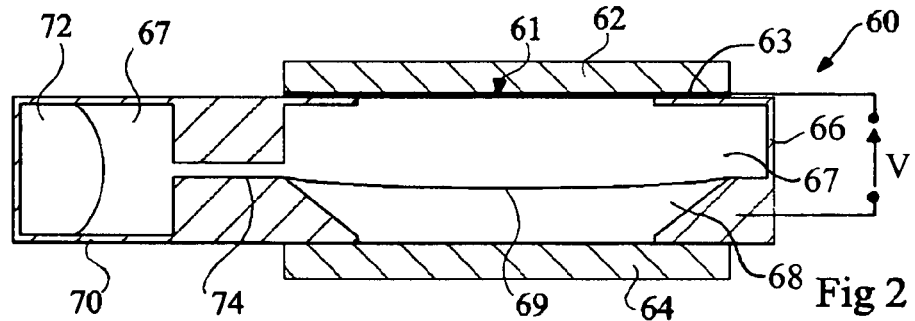
FIG. 2 illustrates the general principle of a liquid lens according to one embodiment of the invention.

FIG. 2 shows generally one example of a variable-focus lens 60 employing the compensation principle according to the present invention. The lens 60 comprises a liquid chamber 61 bounded by two transparent plates 62, 64 fastened on their periphery to an intermediate piece 66. The liquid chamber 61 is entirely filled with two liquids 67, 68, the contact surface of which defines a moveable refractive interface 69. The variable-focus lens 60 further contains a system to deform the moveable refractive interface 69 by electrowetting. For example, the liquid 67 is a conductive liquid, the liquid 68 is an insulating liquid, and the intermediate piece 66 is made of a conductive material coated with an insulating layer (not illustrated specifically), thus forming a first electrode, while a second electrode is formed, for example, by deposition of a conductive transparent layer 63 on the internal surface of the plate 62. Application of a voltage V between the electrodes results in the deformation of the refractive interface 69.

According to the embodiment of FIG. 2, the intermediate piece 66 comprises an expansion chamber 70 partly filled with the liquid 67, with the remainder corresponding to a gas bubble 72. The expansion chamber 70 plays no part in the optical properties of the lens 60. The expansion chamber 70 is connected to the liquid chamber 61 via a passage 74 which, in FIG. 2, is represented by a duct. The shape or the nature of the walls of the expansion chamber 70 and/or of the passage 74 ensures that the gas bubble 72 remains in the expansion chamber 70 and does not penetrate into the liquid chamber 61. When the liquids expand, a greater or lesser amount of liquid 67 penetrates into the expansion chamber 70 or leaves the expansion chamber 70, and causes a change in the volume of the gas bubble 72. Several separate expansion chambers may be provided, each being connected to the liquid chamber 61 so as to provide several small gas bubbles. This makes it possible to minimize the risks of the gas bubbles 72 moving when subjected to mechanical shocks.

Figure 3:
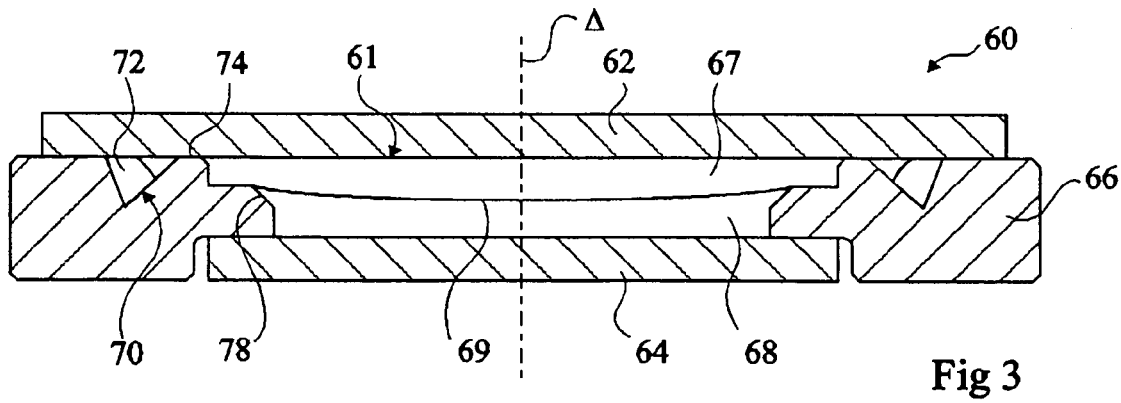
FIGS. 3 to 13 show more detailed exemplary embodiments of a liquid lens according to alternative embodiments of the invention.
Figure 4:
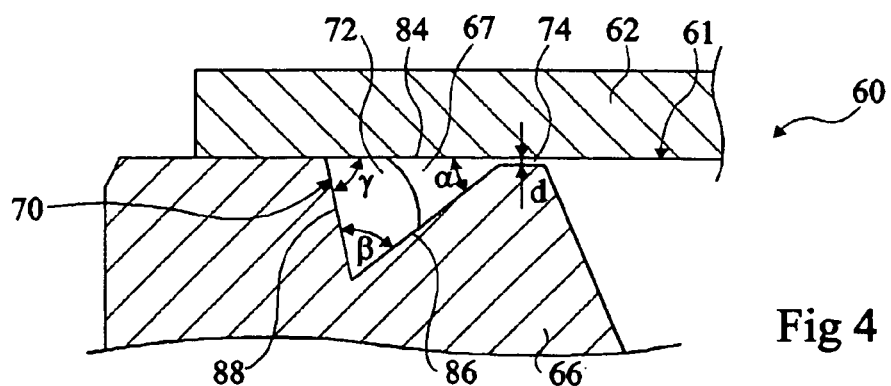

FIGS. 3 and 4 show an overall cross section and a detailed cross section of a first more preferred exemplary embodiment of the variable-focus lens 60 according to another embodiment of the invention. The intermediate piece 66 corresponds to an annular ring having an optical axis Δ, which includes a central opening that defines the liquid chamber 61 containing the two immiscible liquids 67, 68, the interface of which forms the moveable refractive interface 69. The annular ring 66 comprises an internal wall 78 along which the refractive interface 69 can move by electrowetting effects induced by application of a voltage, for example, the same way as described in reference of FIG. 2. For example, the internal wall 78 is preferably conical. In the present example, the liquid 67 is, for example, an aqueous liquid and the liquid 68 is an oily liquid.

In the present embodiment, the expansion chamber 70 has symmetry of rotation about the axis Δ. It is defined by an upper wall 84 corresponding to a portion of the lower wall of the upper plate 62, a lower wall 86 inclined to the upper wall 84 at an angle α, and an end wall 88 inclined to the lower wall 86 at an angle β and to the upper wall 84 at an angle γ. The lower wall 86 and the end wall 88 correspond to portions of the upper wall of the annular ring 66. The passage 74 corresponds, in the first embodiment, to an annular interstice of thickness d (narrow gap), via which the expansion chamber 70 communicates with the liquid chamber 61 so that some of the aqueous liquid 67 can move between the expansion chamber 70 and the liquid chamber 61. Preferably, the thickness d is less than a few tens of microns, i.e., preferably less than 50 microns and preferably within a range of 10 to 50 microns. The interstice 74 need not have a constant thickness, and can be obtained by the upper plate 62 simply pressing on the annular ring 66, the surface irregularities of the plate 62 and of the annular ring 66 being sufficient to ensure the presence of communicating channels between the liquid chamber 61 and the expansion chamber 70.

The walls defining the annular interstice 74 are advantageously covered with a hydrophilic material, so that the capillary forces prevent the gas bubble 72 from passing into the annular interstice 74. The angle α is advantageously smaller than the angles β and γ, so that the aqueous liquid is spontaneously attracted into the corner of angle α, and the gas bubble 72 is pushed back against the end wall 88. So as to make it even easier to position the gas bubble 72 on the end wall 88, the upper and lower walls 84, 86 may be covered with a hydrophilic material, and the end wall 88 may be covered with a hydrophobic material.

Figure 5:
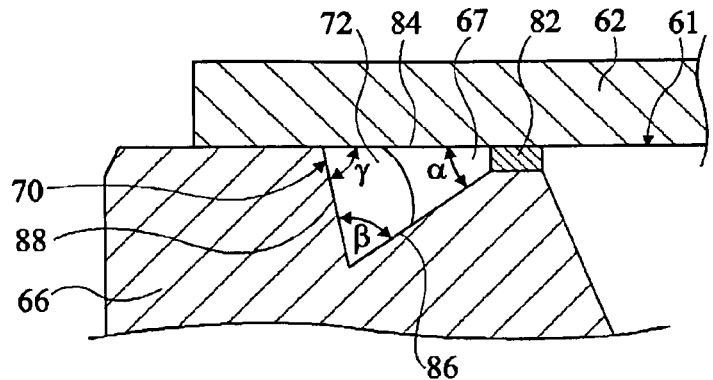

FIG. 5 shows a second more preferred embodiment, similar to the first more preferred embodiment, differing by the fact that the passage comprises a ring 82 of a porous material placed between the expansion chamber 70 and the liquid chamber 61. The porous material may be a hydrophilic material, or the pores of the porous material may be covered with a hydrophilic material. This second more preferred embodiment has the advantage of allowing the gas bubble 72 to be properly stabilized in the expansion chamber 70, since the gas bubble 72 cannot easily penetrate the pores of the porous ring 82.

Figure 6:
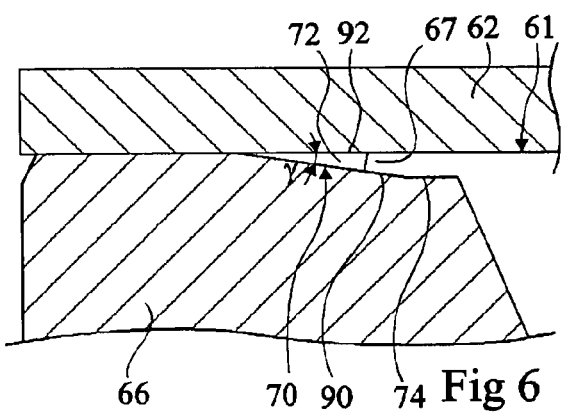

FIG. 6 shows a third more preferred embodiment, in which the expansion chamber 70 comprises a region having a symmetry of revolution about the axis Δ, bounded by a lower wall 90 and an upper wall 92 that are inclined to each other. The cross section of these inclined walls, when viewed in a plane containing the axis Δ, corresponds to a "V" of angle γ. The passage 74 corresponds to an annular region that is an extension of the expansion chamber 70. The walls 90, 92 are covered with a hydrophobic material, so that the gas bubble 72 is naturally localized in the corner of angle γ.

Figure 7:
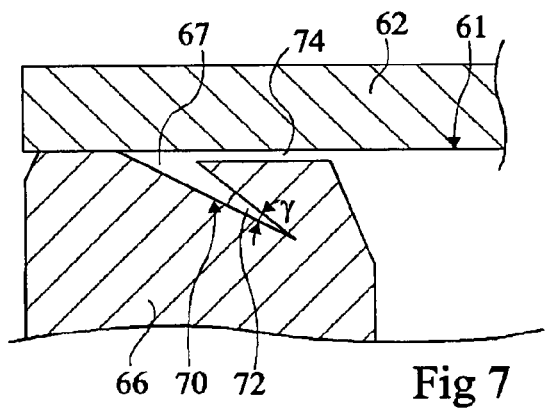

FIG. 7 shows a fourth more preferred embodiment, in which the expansion chamber 70 has an annular shape. The cross section of annular chamber 70 in a plane containing the axis Δ corresponds to a "V" of angle γ, wherein the converging point is directed toward the liquid chamber 61. The passage 74 corresponds to an annular interstice that opens into the expansion chamber 70 on the opposite side from the corner of angle γ. Compared with the third more preferred embodiment, the fourth more preferred embodiment makes it possible to further reduce the risk of the gas bubble 72 penetrating into the liquid chamber 61.

Figure 8:
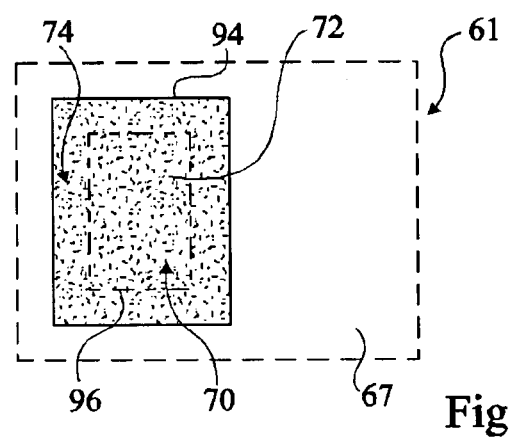

FIG. 8 shows, very schematically, a fifth more preferred embodiment, in which the expansion chamber 70 is formed by the pores of the central region of a block 94 of a porous material. The block is placed in contact with the liquid 67 of the liquid chamber 61, in such a manner that it does not impede the path of the light beams. The dotted line 96 shows the boundary between the gas bubble 72 and the liquid 67. The central region of the block 94 comprises or is covered by a highly hydrophobic material, so that the liquid has no tendency, through a capillary effect, to expel the gas bubble 72 out of the block 94 of porous material. The passage 74 then corresponds to the peripheral region of the block 94.

Figure 9:
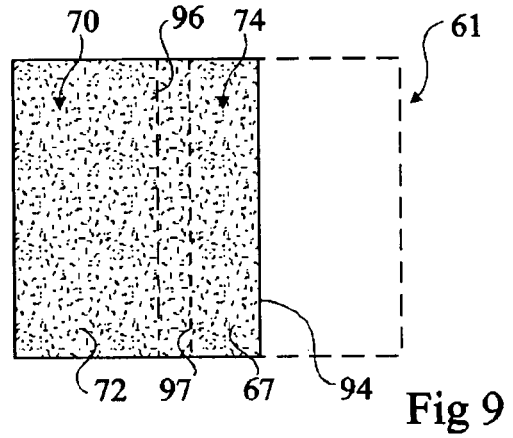

FIG. 9 shows a variant of the fifth more preferred embodiment, in which provision is made for the peripheral region of the block 94 of porous material (which is bounded in FIG. 9 on the side facing liquid chamber 61 by dotted lines 97) in contact with the liquid 67 of the liquid chamber 61 to comprise or be covered by a hydrophilic material, so as to prevent the passage of the gas bubble 72 trapped in the block 94 of porous material.

Figure 10:
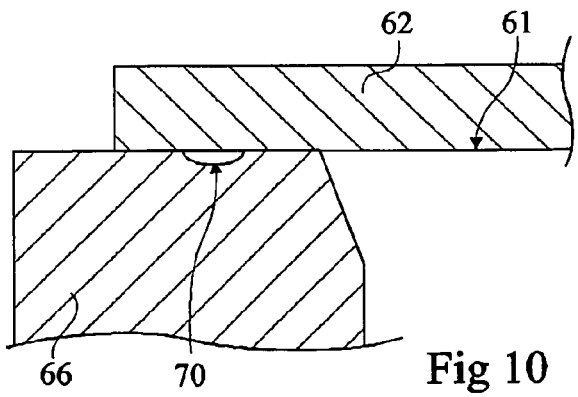
Figure 11:
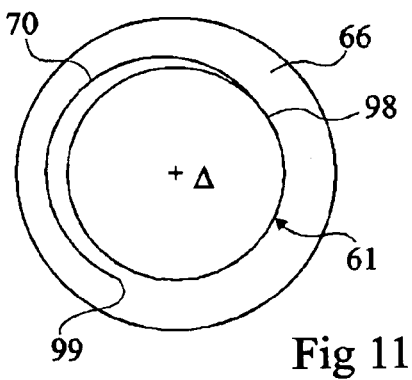

FIGS. 10 and 11 show a cross section and a top view, respectively, of a sixth more preferred embodiment, in which the expansion chamber 70 consists of a groove spiraled around the axis Δ and produced on the upper face of the annular ring 66. One end 98 of the spiral emerges in the liquid chamber 61, while the opposite end 99 is closed. The gas bubble is localized at the closed end 99 of the groove. The walls of the groove are covered with a hydrophobic material, at least at the closed end 99, in order to encourage retention of the gas bubble in this part of the groove. Such an embodiment effectively prevents the gas bubble from escaping out of the groove in the event of shocks.

The first, second, third, fourth and sixth more preferred embodiments have the advantage that the expansion chamber 70 is accessible throughout the process of manufacturing the lens, up to the final steps before the upper plate 62 is fitted. In this way, surface treatment processes, if necessary, may be easily carried out.

In general, it is advantageous to place one or more baffles or labyrinth-forming members in the expansion chamber 70 and/or in the passage 74, because this makes it possible to further reduce the risks of the gas bubble 72 penetrating into the liquid chamber 61, especially in the case of sudden movements of the lens 60. A baffle may be provided in a similar manner to that shown in FIG. 7, in the form of a sharply angled region or several sharply angled regions in the expansion chamber 70. The baffle may also be provided in the passage 74, or between the two. A baffle may also be produced in the form of one or more protuberances placed in the expansion chamber 70, in contact with the liquid 67 or in the passage 74.

Figure 12:
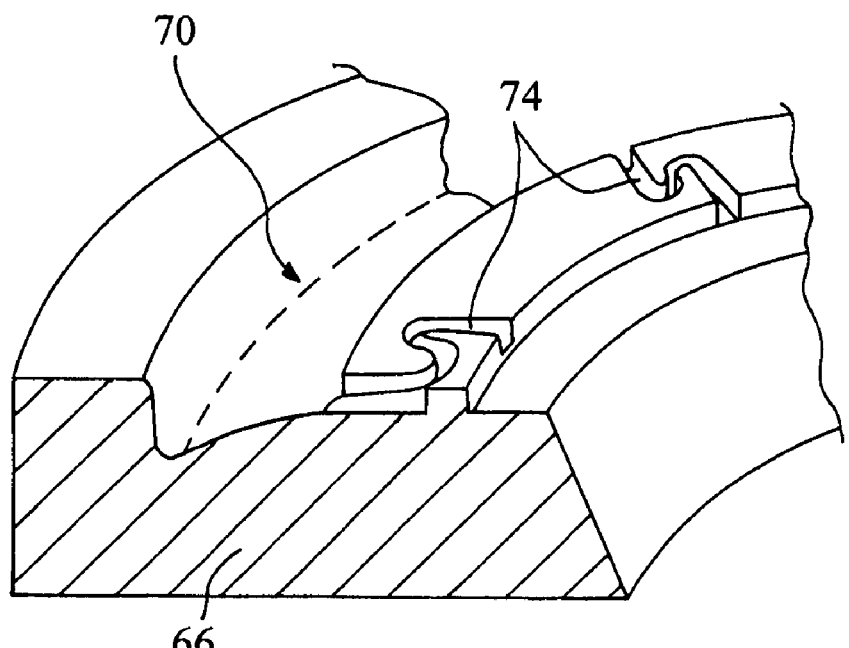

FIG. 12 shows another preferred embodiment, according to which baffles or labyrinth-forming members are placed in the passage 74 between the liquid chamber 61 and the expansion chamber 70. In this example, the passage 74 is formed of a curved duct, having, for example, an "S" shape, therefore further reducing the risk of the gas bubble penetrating into the liquid chamber.

Figure 13:
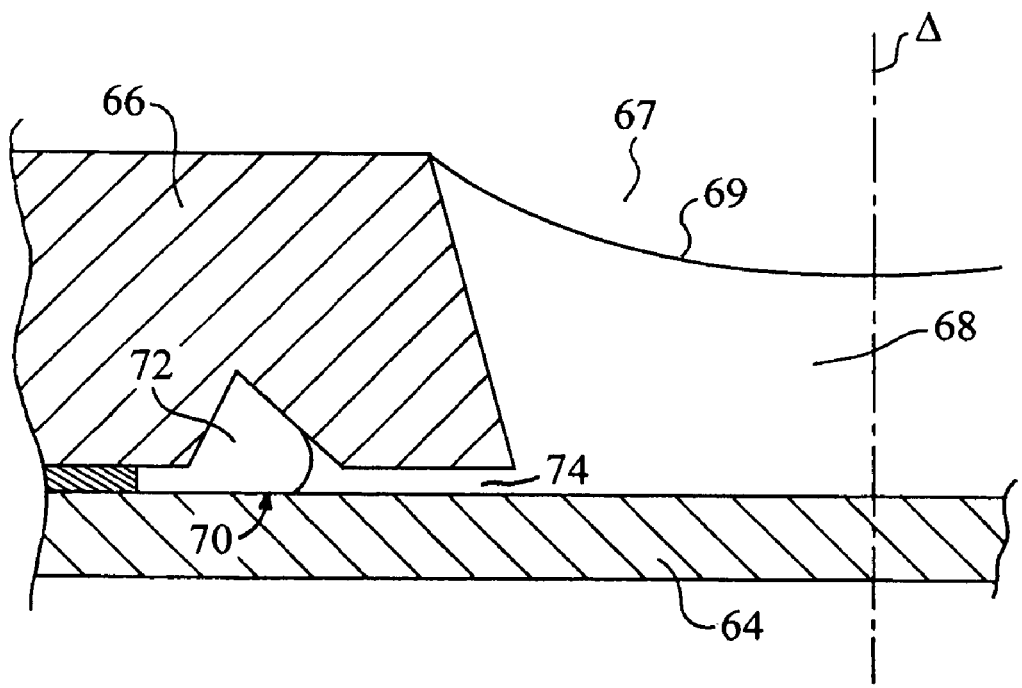

According to another preferred embodiment of the invention, the gas can be in contact with either or both of the two liquids whose interface forms the moveable refractive interface. FIG. 13 represents an embodiment, similar to one depicted in FIGS. 3 to 5, except that the expansion chamber 70 is arranged on the side of the lens close to the plate 64, whereby the gas bubble 72 is in contact with the liquid 68.

The method of manufacturing a lens according to embodiments of the invention may include a step of immersing the lens in the aqueous liquid at ambient pressure, and placing the oily liquid into the liquid chamber 61 before or after immersion of the lens 60 in the aqueous liquid. In this case, when the lens 60 is closed (that is to say when the plates 62, 64 have been fastened to the annular ring 66 in the embodiments described above), the internal pressure of the lens increases due to an excess amount of aqueous liquid that is trapped. As a result, even when closed at ambient pressure, an overpressure is obtained in the lens after closure.

The embodiments described above are particularly suitable for the case in which the lens is filled with aqueous and oily liquids under partial vacuum, so that the liquids that the lens contains are naturally degassed. The internal pressure of the lens 60, after closure of the lens 60, is then equal to the saturation vapour pressure of the aqueous liquid. The saturation vapour pressure of the aqueous liquid is, in general, quite low. To give an example, in the case of water, it is of the order of 2.3 kPa at 20° C., 12.3 kPa at 50 C., 47.4 kPa at 80° C. and 101 kPa at 100° C. The pressure in the lens therefore remains below atmospheric pressure over the entire normal operating temperature range of the lens 60. The upper and lower plates 62, 64 may therefore be placed on either side of the annular ring 66, as shown in FIG. 3, so that the adhesive or the weld for fastening the plates 62, 64 to the annular ring 66 always works in compression. Furthermore, the change in internal pressure remains relatively small, even over a large temperature range. This is because, for temperatures varying from −40° C. to 80° C., the internal pressure of the lens 60, according to embodiment of the invention, that is produced at a sub-atmospheric pressure, varies by less than one atmosphere.

Of course, the teaching or concept of the present invention is capable of various alternative embodiments and modifications that will be apparent to those skilled in the art.

In particular, in the case of the first, second, third and fourth more preferred embodiments, the expansion chamber need not be annular but may correspond to ring sectors distributed on the periphery of the central opening of the annular ring 66.

Moreover, the embodiments described above relate to a lens 60 comprised of three parts 62, 64 and 66. However, it is clear that alternative embodiments of the present invention can be implemented for lenses of different structure, including a larger or smaller number of parts.

A number of preferred embodiments of the invention have been described having a refractive interface moveable by the electrowetting effect. The present invention can also apply to embodiments of variable focus lenses in which the refractive interface between two liquids is moved by other phenomena, for example, by application of pressure.

The volume of gas included in the liquid lens according to different embodiments of the invention can take different forms, including, but not limited to, one or a more gas bubbles, gas dispersed in the pores of a porous material, etc. The applicant has established that the percentage of volume of the gas compared to the overall internal volume of the lens (i.e., the volume containing the first and second liquids) is advantageously comprised between 5% and 50%, more advantageously between 10% and 20%, more advantageously around 15% (under atmospheric pressure), in order to compensate for the expansion.

Although not limited to the application of the variable focus lens in a camera module to be integrated in a mobile phone, the invention is especially well suited for this application. The compensation for the change in temperature can most preferably be obtained with a rigid structure that does not have any elastic parts inducing deformation of the lens, and that can be manufactured using only a small number of pieces.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended to be limiting. The invention is limited only as defined in the following claims and the equivalent thereto.

What is claimed is:

1. A variable-focus lens for focusing light rays in light paths passing through the lens along an optical axis ($\Delta$), the lens comprising an arrangement of first and second immiscible liquids that have different refractive indices and are in contact over a moveable refractive optical interface, a volume of gas in contact with one of said liquids, and a retention measure for keeping the volume of gas away from the light paths of the light rays passing through the lens for focusing.

2. Lens according to claim 1, wherein the arrangement comprises:
   a first chamber containing the first and second liquids;
   a second chamber containing the first liquid and the volume of gas;
   a passage for the first liquid to pass between the first and second chambers.

3. Lens according to claim 2, wherein the first liquid is an aqueous liquid and wherein the passage comprises walls comprising or covered by a hydrophilic material.

4. Lens according to claim 2, wherein the second chamber is bounded by first, second and third walls, the first wall being inclined at a first angle ($\alpha$) to the second wall, the second wall being inclined at a second angle ($\beta$) to the third wall, and the first wall being inclined at a third angle ($\gamma$) to the third wall, the first angle being smaller than the second angle and smaller than the third angle.

5. Lens according to claim 2, wherein the passage comprises pores of a porous material.

6. Lens according to claim 2, wherein the second chamber comprise pores of a porous material, and the volume of gas is dispersed in the pores.

7. Lens according to claim 2, wherein the second chamber has the form of a tube, one end of which opens into the first chamber and the opposite end of which is closed.

8. Lens according to claim 1, wherein the volume of gas comprises one or more gas bubbles.

9. Lens according to claim 1, wherein the gas comprises air, an inert gas or a mixture of inert gases, or the vapour of one of the liquids contained in the lens.

10. Lens according to claim 1, wherein the volume of gas is equal to between 5% to 50% of the internal volume of the lens.

11. Lens according to claim 10, wherein the volume of gas is equal to between 10% to 20% of the internal volume of the lens.

12. Lens according to claim 1, further comprising a system for moving the refractive interface by electrowetting effects.

13. Lens according to claim 1, wherein said arrangement comprises:
   First and second transparent windows; and
   an intermediate piece having said windows sealed thereto and comprising a central opening, with symmetry of rotation about the axis ($\Delta$), that defines a first chamber containing the first and second liquids.

14. Lens according to claim 13, wherein said intermediate piece further comprises a second opening that defines an expansion chamber that connects with the first chamber and contains said volume of gas.

15. Lens according to claim 14, wherein said second opening comprises a groove made in said intermediate piece, with symmetry of rotation about the axis ($\Delta$).

16. Camera module comprising a lens according to claim 1.

17. Mobile phone comprising a camera module according to claim 16.

18. Lens according to claim 2, wherein the first liquid is an insulating liquid.

* * * * *